United States Patent Office 3,634,460
Patented Jan. 11, 1972

3,634,460
RING B-SECOSTEROID TRANSFORMATION
PRODUCTS AND PROCESS
Norman A. Nelson, Galesburg, Mich., assignor to The
Upjohn Company, Kalamazoo, Mich.
No Drawing. Filed July 28, 1969, Ser. No. 845,534
Int. Cl. C07d 7/18
U.S. Cl. 260—343.2 R       15 Claims

ABSTRACT OF THE DISCLOSURE

This invention relatives to novel ring B-secosteroid transformation products, to processes for their preparation and more particularly to compounds embraced by the following formulae:

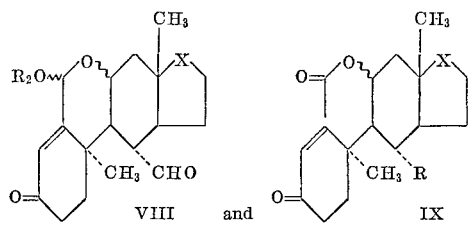

wherein R is —CHO, —COOR$_1$ or —CH$_2$OR$_2$, in which R$_1$ is hydrogen or methyl and R$_2$ hydrogen or acyl; X is

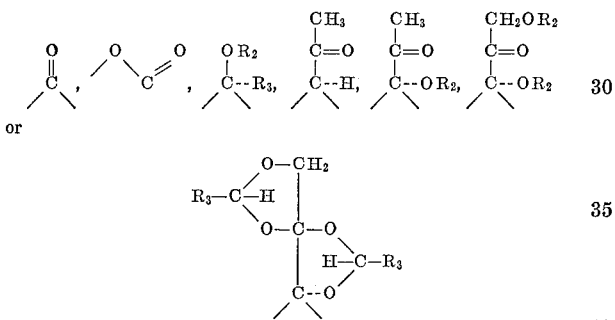

or

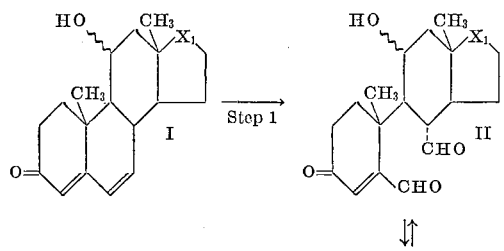

in which R$_2$ has the meaning given above, R$_3$ is hydrogen or lower-alkyl and the alkali metal salts of those compounds wherein R is —COOR$_1$ in which R$_1$ is hydrogen. The compounds of the above formulae are anti-inflammatory agents, antiandrogenic agents and central nervous system stimulants.

SUMMARY OF THE INVENTION

The novel ring B-secosteroid transformation products of this invention, represented by Formulae VIII and IX, above, are valuable pharmaceutical agents. They are new and novel ring structures which are derived from 3-keto-Δ$^{4,6}$-steroids by osmium tetroxide-periodate oxidation. The compounds having the desired ring structure are then converted to other novel derivatives in accordance with methods known in the art.

DETAILED DESCRIPTION OF THE INVENTION

The new compounds and the processes for their production are illustratively represented by the following sequence of formulae:

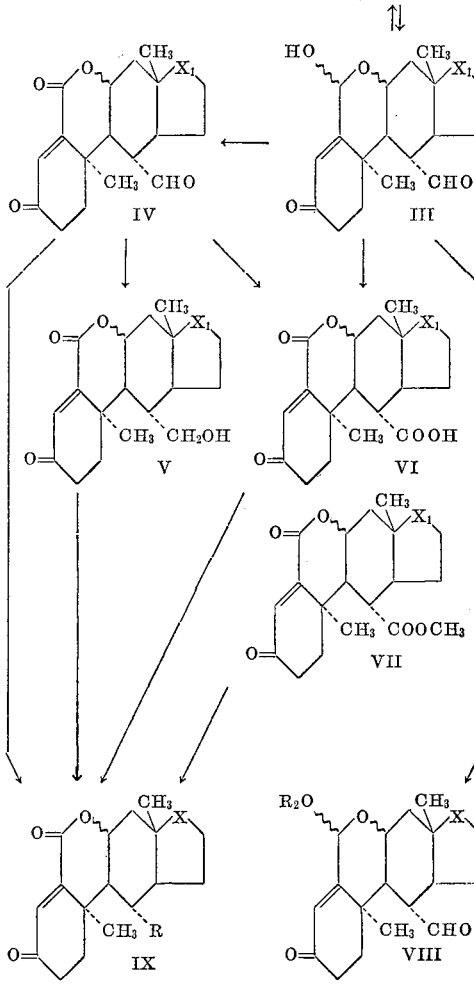

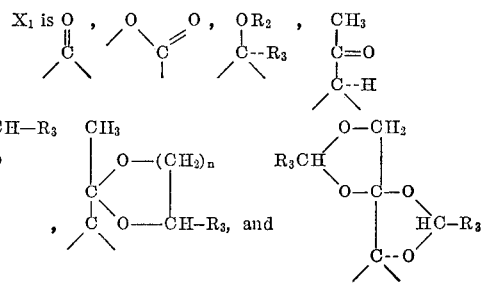

wherein X and R have the meanings given herein, above;

X$_1$ is in which R$_2$ and R$_3$ have the meanings given herein above; and $n$ is the integer 1 or 2.

In this application the term "lower-alkyl" means an alkyl radical of 1 to 6 carbon atoms inclusive such as methyl, ethyl, propyl, butyl, amyl, hexyl and isomeric forms thereof. The term "acyl" means the acyl radical of an organic carboxylic acid, preferably a hydrocarbon carboxylic acid of 1 to 12 carbon atoms, inclusive, such as acetic, propionic, butyric, isobutyric, pivalic, valeric, isovaleric, caproic, caprylic, decanoic, dodecanoic, acrylic, crotonic, hexynoic, heptynoic, octynoic, cyclobutanecarboxylic, cyclopentene-carboxylic, cyclohexane-carboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic, succinic, glutaric, dimethylglutaric, maleic, cyclopentylpropionic acids, and the like. The wavy lines appearing in the structural formulae indicate the α (alpha) configuration, the β (beta) configuration and mixtures thereof.

The novel compounds of Formulae VIII and IX and the alkali metal salts thereof of those compounds, wherein R is —COOR$_1$ in which R$_1$ is hydrogen, are active anti-inflammatory agents, anti-androgenic agents and central nervous system stimulants.

As anti-inflammatory agents the novel compounds of this invention can be used in dosages of 0.5–15 mg./kg. in the treatment of gouty arthritis, rheumatoid arthritis, rheumatoid spondylitis, osteoarthritis, psoriactic arthritis, acute superficial thromobophlebitis and painful shoulder syndromes such as pertiendinitis, capsulities, bursitis, and acute shoulder arthritis as well as contact dermatitis, atopic dermatitis, neurodermatitis, anogenital pruritus, seborrheic dermatitis, and the like, and for the relief of pain and fever.

The novel compositions also find application in the local treatment of inflammatory conditions in animal mastitis, a disease of the mammary glands which can be of particular concern in milk-producing animals such as cows.

As anti-androgenic agents the novel compounds of this invention can be used in dosages of 0.1–5 mg./kg. for the treatment of acne, hirsutism, prostatic hypertrophy and menstrual disorders.

The compounds of this invention are also active as central nervous system agents, useful for modulating the temperament of animals. Compounds can be administered to animals at dosages of about 1 mg./kg. of body weight to produce beneficial responses to environmental stimuli and modulation of temperament.

Suitable solid dosage forms include tablets, pills, capsules, granules, powders, suppositories, and the like. Advantageously the pharmaceutical carriers for such solid forms include corn starch, lactose, dicalcium phosphate, terra alba (calcium sulfate), talc, stearic acid, magnesium stearate, and gums. Suitable fluid dosage forms include solution, suspensions, syrups, and emulsion. Advantageously, the pharmaceutical carrier for such fluid forms comprise water, oils, and water-oil emulsions. If desired, suitable dispersing or suspending agents can be included, for example, tragacanth, acacia, alginates, dextran, sodium carboxymethylcellulose, methylcellulose, polyvinylpyrrolidone, gelatin, and mixtures thereof. Suitable oils for solutions and water-oil emulsions include cottonseed oil, sesame oil, coconut oil, and peanut oil.

The starting materials for the process of this invention, represented by Formula I, above, are either known in the art or can be prepared from the corresponding Δ$^4$-compounds by treatment with chloranil (2,3,5,6-tetrachloro-1,4-benzoquinone) in accordance with procedures well known in the art, for example, Agnello et al. J. Am. Chem. Soc. 82, 4293 (1960). Representative Δ$^4$-compounds which can be converted to the corresponding Δ$^{4,6}$-compounds of Formula I include, for example, 11α- and 11β-hydroxytestosterone;
11α- and 11β-hydroxy-androst-4-ene-3,17-dione;
11α- and 11β-hydroxy-androst-4-en-3,17-dione, 17-ethylene acetal;
11α- and 11β-17-dihydroxy-17α-methyltestosterone;
11α- and 11β-hydroxyprogesterone;
11α- and 11β-hydroxyprogesterone, 20-ethylene acetal; ketal;
11α- and 11β-hydroxytestololactone;
hydrocortisone, 7,20:20,21-bismethylenedioxy acetal;
11α,17α,21 - trihydroxy-4-pregnene-3,20-dione, 17,20:20, 21-bismethylenedioxy acetal;

and the like.

In instances where the 11α-hydroxy starting material is not readily available it can be prepared from the corresponding 11β-hydroxy compounds by methods well known in the art, for example, the protected 11β-hydroxy compound is oxidized with chromic acid (Jones reagent) to obtain the corresponding 11-keto compound which is then converted to 11α-hydroxy by a lithium-ammonia reduction.

In carrying out the process of this invention a Δ$^{4,6}$-compound of Formula I is subjected to an osmium tetroxide-periodate oxidation in accordance with the procedures disclosed by Pappo et al., J. Org. Chem. 21, 478 (1956). The selected Δ$^{4,6}$-compound (I) in an inert solvent such as dioxane, tetrahydrofuran, 1,2-dimethoxyethane and the like is subjected to osmium tetroxide and a water soluble salt of periodic acid such as sodium periodate, potassium periodate, pyridinium periodate, and the like (sodium periodate is preferred) to obtain the compounds of Formula II and III. Although the reaction can be carried out within a wide temperature range, such as from about 0° C. to about 100° C.; it is preferable to carry out the reaction at about room temperature. About 15° C. to about 35° C. is advantageous.

The compounds of Formula II and III exist in equilbrium in solution; the hemiacetal is the preponderant form and is isolated from solution in accordance with known procedures, for example by chromatography, crystallization and the like.

The compounds of Formula III thus obtained, are then oxidized by selective oxidation with an excess of activated manganese dioxide in a suitable solvent such as chloroform, ethyl acetate, benzene, acetone, methylene chloride and the like, to obtain the corresponding compound of Formula IV. The reaction can be carried out within the same temperature range as disclosed above for the osmium tetroxideperiodate reaction with about room temperature being generally preferred. Alternatively, when the starting steriod material (I) is an 11α-hydroxy compound, the compounds of Formula III obtained therefrom, can be selectively oxidized with chromic acid, Jones reagent (a solution of 26.72 g. of chromium trioxide in 23 ml. of concentrated sulfuric acid diluted with water to a volume of 100 ml.) is preferred, to obtain the corresponding oxidized compounds of Formula IV. When chromic acid is to be used as the oxidizing agent other oxidizable hydroxy groups present in the starting material (I) should be protected by acyl groups, bismethylenedioxy groups and the like. Either a theoretical amount or an excess of oxidant can be employed. However, to prevent oxidation of the aldehyde function when an excess is used, the oxidation should be carefully controlled and followed, and the excess oxidant should be destroyed as soon as the desired oxidation is complete.

The compounds of Formula IV, can then be converted to the other compounds of this invention in accordance with methods known in the art, for example, the hydroxymethyl compounds of Formula V are prepared by reduction of the aldehyde function with sodium borohydride followed by selective oxidation with manganese dioxide of any allylic alcohols inadvertently produced.

The compounds of Formulae III and IV can be converted to corresponding carboxylic acids of Formula VI by chromic acid oxidation using an excess of oxidant, Jones reagent is preferred. If compounds III and IV contain other oxidizable hydroxy groups they can be protected by conventional methods such as acylation as hereinafter described.

The carboxylic acids of Formula VI can be converted to their corresponding methyl esters (VII) in accordance with known methods for example by reaction with ethereal diazomethane in a suitable organic solvent such as tetrahydrofuran, ether, methylene chloride, methanol or mixtures of these solvents. When the reaction is complete, the excess diazomethane is destroyed with acetic acid and the product isolated by conventional methods. The ethylene acetal groups in the substituent "X$_1$," of compounds III, IV, V, VI and VII can be removed by a conventional aqueous acid hydrolysis in the presence of a cosolvent such as methanol, ethanol, tetrahydrofuran, acetone, acetic acid, dioxane and the like. The acid can be p-toluenesulfonic, methanesulfonic, hydrochloric, sulfuric, formic, acetic or similar acid. It is most convenient to conduct the reaction at room temperature for 1-24 hours, but higher temperatures and shorter reaction times can be used [see Djerassi "Steroid Reactions," Holden-Day Inc., San Francisco, 1963, pp. 17–22]. The bismethylenedioxy group in the substituent "$X_1$," of compounds III, V, VI and VII and substituent "X" of compounds IX and VIII can be removed by conventional hydrolysis. For example by heating the compound in 50% aqueous acetic acid on a steam bath for 2-4 hours, or by heating the compound with 60% aqueous formic acid at 80–100° for 5–50 min. (see Djerassi, supra, pp. 60–61).

Acyl derivatives of the compounds of this invention are prepared in accordance with methods commonly used for preparing steroid acylates, for example by treating the compound in pyridine with excess acid anhydride or acid chloride at about room temperature for 1-24 hours, or by heating the selected compound with an acid anhydride in the presence of an alkali earth carbonate such as calcium carbonate. Acylating agents which can be employed are for example the anhydrides and chlorides of those acids hereinbefore listed. The excess acylating agent is destroyed by cautious addition of water to the reaction mixture at 0–10° and the product is then isolated by conventional methods.

Alkali metal salts of the carboxylic acids of Formula VI are prepared by treating the selected compounds VI with one equivalent of aqueous sodium hydroxide, sodium carbonate, sodium bicarbonate, potassium hydroxide, potassium carbonate, or potassium bicarbonate. Cosolvents such as methanol, acetone, tetrahydrofuran and the like can be employed to initially dissolve the acid or the acid can be extracted into the aqueous base from a water immiscible solvent such as ether, methylene chloride, chloroform, etc. The solution of carboxylic acid salt is concentrated in vacuo to a small volume and the salt is precipitated by addition of acetone, or the salt can be isolated by freeze drying.

The following preparation and examples illustrate the best mode contemplated by the inventor for carrying out his invention, but are not to be construed as limiting the scope thereof.

PREPARATION 1

*11α,17β-dihydroxyandrosta-4,6-diene-3-one*

A mixture of 60 g. of 11α-hydroxytestosterone, 60 g. of recrystallized (dioxane) chloranil and 700 ml. of t-butyl alcohol is stirred under reflux for 60 min., then concentrated in vacuo. The residue thus obtained, is dissolved in warm chloroform, washed with dilute potassium hydroxide solution, water, saturated sodium chloride solution, dried by filtration through anhydrous sodium sulfate and the dried solution is then concentrated in vacuo. Trituration of the residue so obtained with acetonitrile gives 31.5 g. of 11α,17β-dihydroxyandrosta-4,6-diene-3-one, M.P. 242–244°; an analytical sample crystallized from tetrahydrofuran-ethyl acetate melts at 244°;

$\lambda_{max.}^{EtOH}$ 284 mµ

($\epsilon$ 26,200); IR and NMR spectra and consistent with the assigned structure.

*Analysis.*—Calcd. for $C_{19}H_{26}O_3$ (percent): C, 75.46; H, 8.67. Found (percent): C, 75.79; H, 8.77.

PREPARATION 2

*11α-hydroxypregna-4,6-diene-3,20-dione*

Recrystallized chloranil (120 g.) is stirred with 120 g. of 11α-hydroxy-4-pregnene-3,20-dione and 1440 ml. of t-butyl alcohol while heating at reflux temperature for one hour. The solvent is removed in vacuo and 10% v./v. methyl alcohol in chloroform is added. The organic solution is washed with potassium hydroxide solution, water and dried. Crystallization from acetonitrile gives 29.6 g. of 11α-hydroxypregna-4,6-diene-3,20-dione melting at 158°–160° C.

EXAMPLE 1

*1,2,3,5,6a,7,7a,8,9,10,10a,11,11a,11b - tetradecahydro-5ξ, 8β-dihydroxy-7aβ,11α - dimethyl - 3 - oxobenz[d]indeno[5,6-b]pyran-11α-carboxaldehyde and 1,2,3,5,6a, 7,7a,8,9,10,10a,11,11a,11b - tetradecahydro - 8β - hydroxy-7aβ,11bα-dimethyl - 3,5-dioxobenz[d]indeno[5, 6-b]pyran-11α carboxaldehyde*

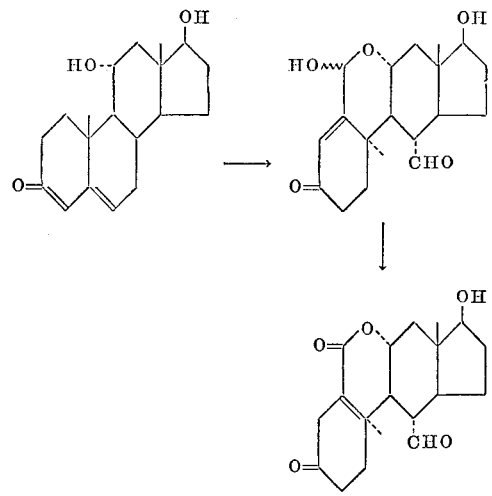

To a stirred mixture of 72.6 g. (0.24 mole) of 11α,17β-dihydroxy-androsta-4,6-diene-3-one, 1500 ml. of dioxane, 300 ml. of water, 60 ml. of pyridine and 4 g. of osmium tetroxide under a nitrogen atmosphere is added at intervals of 0, 1.5 and 3.0 hr. freshly prepared solutions of 34.2 g. (0.16 mole) of sodium metaperiodate in 120 ml. of water. One hour after the last addition of periodate, a solution of 51.6 g. (0.24 mole) of sodium periodate in 240 ml. of water is added followed by 150 ml. of dioxane. The mixture is then stirred at room temperature for about 24 hours. The reaction mixture is filtered and the collected inorganic precipitate is washed with dioxane-absolute ethanol (4:1). The filtrate and washings are combined and concentrated in vacuo until solids begin to precipitate. The concentrate is extracted with two 1 l. portions of 20% ethanolchloroform and then hydrogen sulfide is then passed into the combined organic extracts for about 2 min. The mixture is filtered through a pad of Celite (diatomaceous earth) and then a pad of Magnesol (magnesium silicate) (92 mm. dia. x 100 mm. high) to give filtrate A. The Magnesol pad is then washed with about 4 l. of 25% ethanol-chloroform to give filtrate B. Concentration of filtrate A in vacuo and trituration of the residue with acetonitrile gives 30.6 g. (38%) of the hemiacetal, 1,2,3,5,6a,7,7a,8,9,10,10a,11,11a,11b - tetradecahydro-5ξ,8β-dihydroxy-7aβ,11α-dimethyl - 3 - oxobenz[d]indeno[5,6-b]pyran-11α - carboxaldehyde, M.P. 236° C. (dec.).

Concentration of filtrate B gives 31 g. of crude residue which is dissolved in 1500 ml. of 15% ethanol-chloroform and treated with 150 g. of activated manganese dioxide. The mixture is stirred at room temperature for about 20 hr. and 200 ml. of ethanol is added. The mixture is filtered and the precipitate washed with about 1 l. of 25% ethanol-chloroform. The filtrate and washings are combined and concentrated in vacuo to give 24 g. of a residue which is chromatographed on a column prepared from 3 kg. of silica gel wet-packed with 5% ethanol-chloroform. Elution of the column with 5% ethanol-chloroform gives from the first band a residue which on trituration with acetonitrile yields 11.3 g. (14%) of lactone, 1,2,3,5,6a,7, 7a,8,9,10,10a,11,11a,11b-tetradecahydro - 8β - hydroxy-7aβ, 11bα - dimethyl - 3,5 - dioxobenz[d]indeno-[5,6-b]

pyran-11α-carboxaldehyde, M.P. 283° C. (dec.); an analytical sample of the lactone is crystallized from acetonitrile, M.P. 288° C. (dec.);

$$\lambda_{max.}^{EtOH}\ 233\ m\mu$$

(ε 8,800), IR, NMR and mass spectra support the assigned structure.

*Analysis.*—Calcd. for $C_{19}H_{24}O_5$ (percent): C, 68,65; H, 7.28. Found (percent): C, 68.42; H, 7.39.

EXAMPLE 2

*1,2,3,5,6a,7,7a,8,9,10,10a,11,11a,11b-tetradecahydro - 8β-hydroxy-7aβ, 11bα-dimethyl - 3,5 - dioxobenz[d]indeno [5,6-b]pyran-11α-carboxaldehyde*

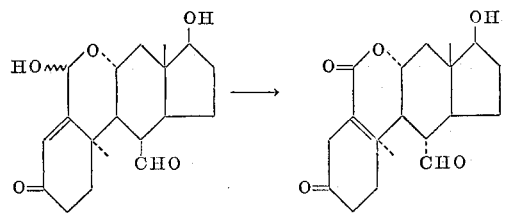

A mixture of 18.5 g. of the hemiacetal, from Example 1, above, 1 l. of 10% absolute ethanol-chloroform and 100 g. of activated manganese dioxide is stirred at room temperature for 16 hrs., and then 100 ml. of absolute ethanol is added. The mixture is filtered through a pad of Celite and the collected solids are washed with 20% ethanol-chloroform (ca. 1 l.). The filtrate and washings are combined and concentrated in vacuo. Trituration of the residue with acetonitrile gives 10.2 g. of the lactone, 1,2,3, 5,6a,7,7a,8,9,10,10a,11,11a,11b - tetradecahydro - 8β-hydroxy - 7aβ-11bα-dimethyl - 3,5 - dioxobenz[d]indeno [5,6-b]pyran-11α-carboxaldehyde, M.P. 283° C. (dec.) and 4 g. with M.P. 280° C. (dec) are obtained from the mother liquor

EXAMPLE 3

*1,2,3,5,6a,7,7a,8,9,10,10a,11,11a,11b-tetradecahydro - 8β-hydroxy-7aβ,11bα-dimethyl - 3,5 - dioxobenz[d]indeno [5,6-b]pyran-11α-carboxaldehyde, acetate*

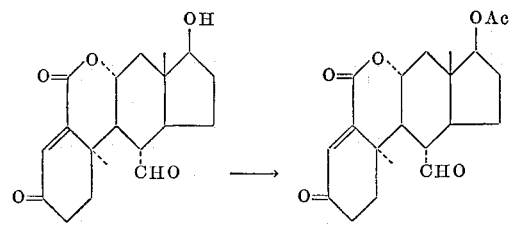

A mixture of 19 g. of the lactone, prepared in Example 2, above, 190 ml. of pyridine and 75 ml. of acetic anhydride is stirred at room temperature for 16 hr., then cooled and the excess acetic anhydride is hydrolyzed by the dropwise addition of water keeping the temperature of the reaction mixture below 10° C. The mixture is then shaken with chloroform and excess cold dilute hydrochloric acid. The organic layer is separated, washed with dilute potassium hydroxide solution, water, dried and concentrated in vacuo. Trituration of the residue thus obtained with acetonitrile gives 17.45 g. of 1,2,3,5,6a,7,7a,8,9,10,10a,11, 11a,11b-tetradecahydro-8β-hydroxy-7aβ-11bα - dimethyl-3,5-dioxobenz[d]indeno[5,6-b]pyran - 11α - carboxaldehyde, acetate, M.P. 285° C. (dec.) and a 2.45 g. second crop with M.P. 283–285° C (dec.); an analytical sample crystallized from acetonitrile has M.P. 282–284° C. (dec.), $$\lambda_{max.}^{EtOH}\ 231\ m\mu$$

(ε 9,750); IR, NMR and mass spectra support the structure.

*Analysis.*—Calcd. for $C_{21}H_{26}O_6$ (percent): C, 67.36; H, 7.00. Found (percent): C, 67.53; H, 7.09.

EXAMPLE 4

*1,2,3,5,6a,7,7a,8,9,10,10a,11,11a,11b-tetradecahydro - 8β-hydroxy-7aβ,11bα-dimethyl - 3,5 - dioxobenz[d]indeno [5,6-b]pyran-11α-carboxylic acid, acetate*

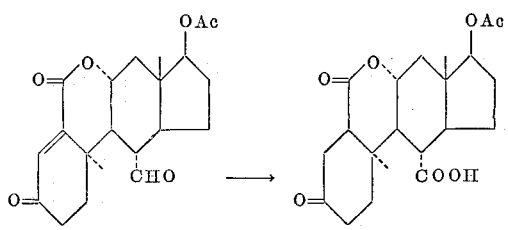

To a solution of 6 g. of the product of Example 3, above, 250 ml. of methylene chloride and 250 ml. of acetone is added with stirring 10 ml. of Jones reagent [J. Org. Chem., 21, 1547 (1956)]. The reaction is allowed to proceed for about 30 min. at room temperature. The mixture is then diluted with 500 ml. of water and extracted with chloroform (500 ml.). The organic layers are combined, washed with water, dried over sodium sulfate and concentrated in vacuo to give 6 g. of 1,2,3,5, 6a,7,7a,8,9,10,10a,11,11a,11b-tetradecahydro - 8β - hydroxy-7aβ,11bα - dimethyl - 3,5 - dioxobenz(d)indeno [5,6-b]pyran-11α-carboxylic acid, acetate, M.P. 305° C. (dec.); which is recrystallized from dioxane to give 5.2 g. melting at 314° C. (dec.), and which after one additional recrystallization has a melting point of 215° C. (dec.);

$$\lambda_{max.}^{EtOH}\ 231\ m\mu$$

(ε 9,950); IR, NMR and mass spectra support the structure.

*Analysis.*—Calcd. for $C_{21}H_{26}O_7$ (percent): C, 64.60; H, 6.71. Found (percent): C, 64.57; H, 6.71.

EXAMPLE 5

*1,2,3,5,6aβ,7,7a,8,9,10,10a,11,11a,11b - tetradecahydro-7aβ,11bα dimethyl - 3,5 - dioxobenz[d]indeno[5,6-b] pyran-11α-carboxylic acid, methyl ester, acetate*

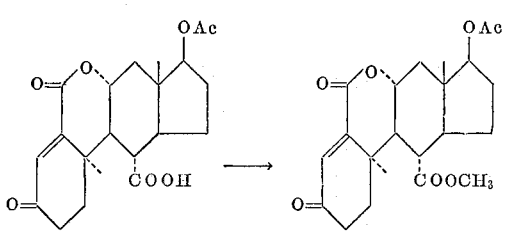

The procedure of Example 4, above, is repeated through the extraction and concentration steps to give 6.0 g. of crude residual 1,2,3,5,6a,7,7a,8,9,10,10a,11,11a,11b-tetradecahydro - 8β-hydroxy-7aβ,11bα-dimethyl-3,5-dioxobenz [d]indeno[5,6-b]pyran-11α-carboxylic acid, acetate. The 6 g. of the 11α-carboxylic acid product thus obtained is dissolved in 700 ml. of tetrahydrofuran and 125 ml. of methanol and treated with excess ethereal diazomethane for 5 min. The excess diazomethane is destroyed with acetic acid and the resulting mixture is concentrated in vacuo. A chloroform solution of the residue thus obtained is washed with dilute potassium hydroxide solution, water, dried over sodium sulfate and concentrated. The residue thus obtained is crystallized from methanol to give 4.4 g. of 1,2,3,5,6aβ,7,7a,8,9,10,10a,11,11a,11b - tetradecahydro-7aβ,11α - dimethyl-3,5-dioxobenz[d]indeno[5,6-b]pyran-11α carboxylic acid, methyl ester, acetate, M.P. 201–202.5° C. and 1.0 g. from a 2nd crop M.P. 197° C.; an analytical sample from methanol has a melting point of 203–204° C.;

$$\lambda_{max.}^{EtOH}\ 231\ m\mu$$

(ε 10,450); IR, NMR and mass spectra are in agreement with the structure.

*Analysis.*—Calcd. for $C_{22}H_{28}O_7$ (percent): C, 65.33; H, 6.98. Found (percent): C, 65.23; H, 7.08.

EXAMPLE 6

*1,2,6a,7,7a,8,9,10,10a,11,11a,11b - dodecahydro-8β-hydroxy - 11α-(hydroxymethyl)7aβ,11bα-dimethylbenz[d]indeno[5,6-b]pyran-3,5-dione, 8-acetate*

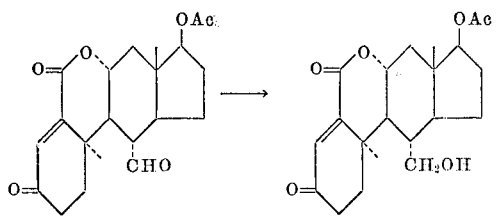

To a well-stirred suspension of 7.48 g. (0.020 mole) of the product of Example 3, above, 120 ml. of methylene chloride and 80 ml. of absolute ethanol at 0° is added a solution of 0.38 g. (0.040 equiv.) of sodium borohydride in 2 ml. of water and 10 ml. of ethanol. Five minutes later 2.4 g. (0.04 mole) of acetic acid is added dropwise and the resulting mixture is concentrated in vacuo. Absolute ethanol (100 ml.) is added to the residue and the mixture is concentrated in vacuo to remove traces of water. The residue is then dissolved in 40 ml. of absolute ethanol and 360 ml. of chloroform and 40 g. of activated manganese dioxide is added. The mixture is stirred at room temperature for 20 hours, 100 ml. of ethanol is added and the solids are removed by filtration. The solids thus obtained are washed with 15% ethanol-chloroform until the washings are free of product. Concentration of the total filtrate in vacuo gives a residue which is chromatographed on a column prepared by wet packing 1.5 kg. of silica gel with 5% ethanol-chloroform. Elution with the same solvent gives an initial band of material from which 185 mg. of starting material is obtained (from methanol) M.P. 285° C. (dec.). The second band of material is crystallized from acetone-hexanes to give 2.05 g. of 1,2,6a,7,7a,8,9,10,10a,11,11a,11b-dodecahydro - 8β-hydroxy - 11α-(hydroxymethyl) - 7aβ,11bα-dimethylbenzyl[indeno[5,6-b]pyran-3,5-dione, 8-acetate, M.P. 212–213° C.., an additional 2.6 g. of the same product, M.P. 211–215.5° C. is recovered from the mother liquors. An analytical sample of the product recrystallized from ethyl acetate-hexane give 1,2,6a,7,7a,8,9,10,10a,11,11a,11b - dodecahydro-8β-hydroxy-11α-(hydroxymethyl)-7aβ,11bα-dimethylbenz[d]indeno[5,6-b]pyran-3,5 - dione, 8 - acetate, M.P. 213–214° C.

$\lambda_{max.}^{EtOH}$ 231 mμ

(ε 10,000); IR, NMR and mass spectra are in agreement with the structure.

*Analysis.*—Calcd. for $C_{21}H_{28}O_6$ (percent): C, 67.00; H, 7.50. Found (percent): C, 67.23; H, 7.72.

EXAMPLE 7

*1,2,3,5,6a,7,7a,8,9,10,10a,11,11a,11b - tetradecahydro-5α,8β - dihydroxy - 7ab,11bα-dimethyl-3-oxobenz[d]indeno[5,6b]-pyran - 11α - carboxaldehyde, diacetate and 1,2,3,5,6a,7,7a,8,9,10,10a,11,11a,11b - tetradecahydro - 5β,8β - dihydroxy - 7ab,11bα-dimethyl-3-oxobenz[d]indeno[5,6-b] - pyran-11α - carboxaldehyde, diacetate*

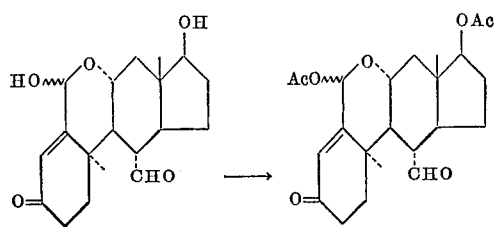

A mixture of 7 g. of 1,2,3,5,6a,7,7a,8,9,10,10a,11,11a,11b-tetradecahydro-5ξ,8β - dihydroxy-7aβ,11α-dimethyl-3-oxobenz[d]indeno[5,6-b]pyran-11α-carboxaldehyde from Example 1, above, 70 ml. of pyridine and 30 ml. of acetic anhydride is stirred overnight at room temperature. The mixture is cooled and 50 ml. of water is added dropwise keeping the temperature of the mixture below 5° C. Ten minutes after addition of the water, the mixture is shaken with chloroform and excess cold dilute hydrochloric acid. The organic layer is washed with dilute potassium hydroxide solution and water, dried and concentrated in vacuo to give a mixture of 1,2,3,5,6a,7,7a,8,9,10,10a,11,11a,11b - tetradecahydro - 5α,8β-dihydroxy-7ab,11bα-dimethyl - 3 - oxobenz[d]indeno[5,6-b]-pyran-11α-carboxaldehyde, diacetate and 1,2,3,5,6a,7,7a,8,9,10,10a,11,11a,11b-tetradecahydro-5β,8β - dihydroxy-7ab,11bα-dimethyl-3-oxobenz[d]indeno[5,6-b] - pyran - 11α-carboxaldehyde, diacetate. The NMR spectrum of the product indicated the presence of about 60% of the 5α-acetoxy isomer and 40% of the 5β-acetoxy isomer.

EXAMPLE 8

*8β - acetyl - 11α-formyl-1,2,6a,7,7a,8,9,10,10a,11,11a, 11b - dodecahydro - 5ξ-hydroxy - 7aβ,11bα-dimethylbenz[d]indeno[5,6-b]pyran-3,5-dione*

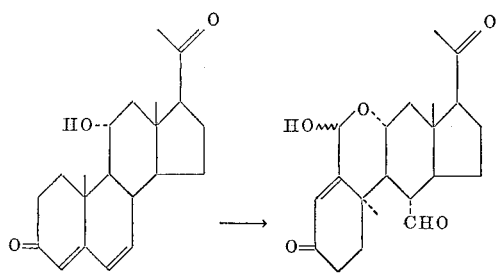

To a solution of 187 g. of 11α-hydroxy-4,6-pregnadiene-3,20-dione in 3.3 l. of dioxane, 135 ml. of pyridine and 550 ml. of water is added 10 g. of osmium tetroxide followed immediately by 425 ml. of a solution of 235 g. of sodium (meta) periodate in 1010 ml. of water. The remainder of the solution is added in two equal parts, the first addition 1.5 hr. from time zero and the second 3 hours from time zero (addition of osmium tetroxide). An additional 118 g. of sodium (meta) periodate in 500 ml. of water is added 6 hours after time zero. After stirring overnight at room temperature, the solids are removed by filtration. Chloroform is added to the filtrate and the organic layer is dried by filtration through a pad of magnesium sulfate. The filtrate is treated with hydrogen sulfide gas for 10 minutes. Solids are removed by filtration through a pad of diatomaceous earth. The filtrate is concentrated to dryness in vacuo. The residue thus obtained is dissolved in 10% (v./v.) ethanol in chloroform and filtered through a pad of magnesium silicate (Magnesol). Elution with 30% (v./v.) ethanol in chloroform and concentration of the effluent gives 96.2 g. of 8β-acetyl-11α - formyl - 1,2,6a,7,7a,8,9,10,10a,11,11a,11b - dodecahydro - 5ξ - hydroxy-7aβ,11bα-dimethylbenz]indeno[5,6-b]pyran-3,5-dione, M.P. 213–215° C.;

$\lambda_{max.}^{EtOH}$ 232; am, 12,240

The IR, NMR and mass spectra support the asigned structure.

An analytical sample crystallized from acetonitrile gives M.P. 220–225° C. (dec.).

Analysis.—Calcd. for $C_{21}H_{28}O_5$ (percent): C, 69.97; H, 7.83. Found (percent): C, 70.03; H, 7.85.

EXAMPLE 9

8β - acetyl - 11α - formyl - 1,2,6a,7,7a,8,9,10,10a,11,11a, 11b - dodecahydro - 7aβ,11bα-dimethylbenz[d]indeno-[5,6-b]-pyran-3,5-dione

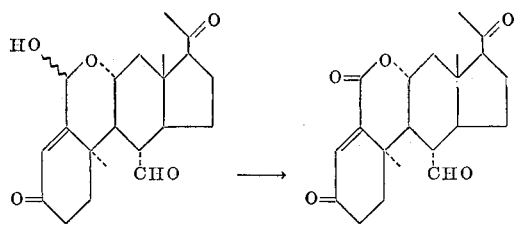

To 75 g. of 8β-acetyl-11α-formyl-1,2,6a,7,7a,8,9,10,10a, 11,11a,11b - dodecahydro-5ξ-hydroxy-7aβ,11bα-dimethylbenz[d]indeno[5,6-b]pyran - 3,5 - dione in 2.5 l. of 10% (v./v.) ethanol in chloroform is added 225 g. of activated manganese dioxide. The mixture is stirred at ambient temperature for about 24 hours, filtered and the filtrate concentrated in vacuo. Crystallization from ethyl alcohol gives 60.7 g. of the desired lactone, 8β-acetyl-11α-formyl - 1,2,6a,7,7a,8,9,10,10a,11,11a,11b - dodecahydro-7aβ,11bα - dimethylbenz[d]indeno[5,6-b] - pyran - 3,5-dione melting at 239°–242° C. (dec.); an analytical sample melts at 241° C. (dec.) and exhibits IR and NMR spectra which are in agreement with the structure.

Analysis.—Calcd. for $C_{12}H_{26}O_5$ (percent): C, 70.36; H, 7.31. Found (percent): C, 69.95; H, 7.24.

EXAMPLE 10

8β - acetyl - 1,2,3,5,6aβ,7,7a,8,9,10,10a,11,11a,11b -tetradecahydro - 7aβ,11bα - dimethyl - 3,5 - dioxobenz[d]indeno[5,6-b]pyran-11α-carboxylic acid

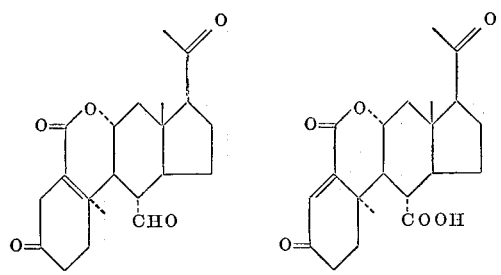

To a solution of 25 g. of 8β-acetyl-11α-formyl-1,2,6a,7, 7a,8,9,10,10a,11,11a,11b - dodecahydro - 7aβ,11bα - dimethylbenz[d]indeno[5,6-b]pyran-3,5-dione in 230 ml. of acetone, and 290 ml. of methylene chloride is added 25 ml. of Jones reagent while maintaining the temperature at about 5° C. The cooling bath is then removed and stirring is continued for about 2 hours. Isopropyl alcohol is then added to destroy the excess oxidant. The mixture is poured into ice water and methylene chloride. The organic layer is removed, washed with water and dried. Crystallization from ethyl acetate gives 16.7 g. of the desired acid, 8β - acetyl - 1,2,3,5,6aβ,7,7a,8,9,10,10a,11,11a,11b-tetradecahydro - 7aβ,11bα - dimethyl - 3,5 - dioxobenz[d] indeno[5,6-b]pyran-11α-carboxylic acid, melting at 259°–261° C.;

$\lambda_{max.}^{EtOH}$ 231 mµ

(ε 10,200); IR and NMR spectra support the structure; an analytical sample, crystallized from methanol, is a different polymorph and melts at 268–270° C.

Analysis.—Calcd. for $C_{21}H_{26}O_6$ (percent): C, 67.36; H, 7.00. Found (percent): C, 66.89; H, 7.03.

EXAMPLE 11

8β - acetyl - 1,2,3,5,6aβ,7,7a,8,9,10,10a,11,11a,11b - tetradecahydro - 7aβ,11bα - dimethyl - 3,5 - dioxobenz[d]indeno[5,6-b]pyran-11α-carboxylic acid

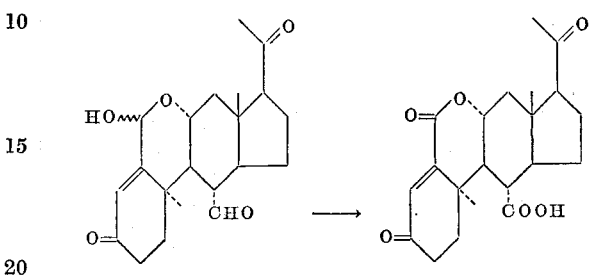

To a cooled (5°) suspension of 5 g. of 8β-acetyl-11α-formyl - 1,2,6a,7,7a,8,9,10,10a,11,11a,11b - dodecahydro-5ξ - hydroxy - 7aβ,11bα-dimethylbenz[d]indeno[5,6-b]pyran-3,5-dione in 150 ml. of acetone and 150 ml. of methylene chloride is added 10 ml. of Jones reagent. The cooling bath is removed and stirring continued for 3 hours. The same workup as in Example 10 above is used to afford 3.4 g. of crystalline 8β-acetyl-1,2,3,5,6aβ,7,7a,8,9,10, 10a,11,11a,11b - tetrahydro-7aβ,11bα-dimethyl-3,5-dioxobenz[d]indeno[5,6-b]pyran-11α-carboxylic acid, melting at 255°–258° C.; infrared and NMR spectra are identical to those obtained upon analysis of the same product obtained in Example 10 above.

EXAMPLE 12

8β - acetyl - 1,2,3,5,6aβ,7,7a,8,9,10,10a,11,11a,11b - tetradecahydro - 7aβ,11bα - dimethyl - 3,5 - dioxobenz[d]indeno[5,6-b]-pyran-11α-carboxylic acid, methyl ester

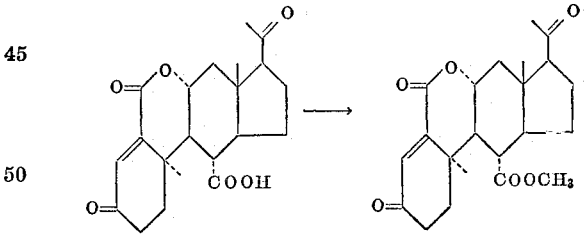

A slight excess of ethereal diazomethane is added with stirring to a mixture of 6 g. of the carboxylic acid prepared in Example 11, above, 100 ml. of methylene chloride and 100 ml. of ether. After 5 minutes of reaction time, the excess diazomethane is destroyed by the addition of a few drops of acetic acid and the solvents are removed in vacuo. A chloroform solution of the residue thus obtained is washed with dilute hydrochloric acid, dilute potassium hydroxide solution and water. The dried solution is concentrated in vacuo and the residue is crystallized from acetonitrile to give 5.3 g. of 8β-acetyl-1,2,3, 5,6aβ,7,7a,8,9,10,10a,11,11a,11b - tetradecahydro - 7aβ, 11bα - dimethyl - 3,5 - dioxobenz[d]indeno[5,6-b]-pyran-11α-carboxylic acid, methyl ester, M.P. 216–217° C.; an analytical sample melted at 217–218°, $\lambda_{max.}^{EtOH}$ 230 mµ

(ε 10,300); NMR, IR and mass spectra are in agreement with the structure.

Analysis.—Calcd. for $C_{22}H_{28}O_6$ (percent): C, 68.02; H, 7.27. Found (percent): C, 68.07; H, 7.31.

13

EXAMPLE 13

*1,2,3,5,6a,7,7a,8,9,10,10a,11,11a,11b - tetradecahydro - 7aβ,11bα - dimethyl - 3,5,8 - trioxobenz[d] indeno[5,6-b]-pyran-11α-carboxaldehyde*

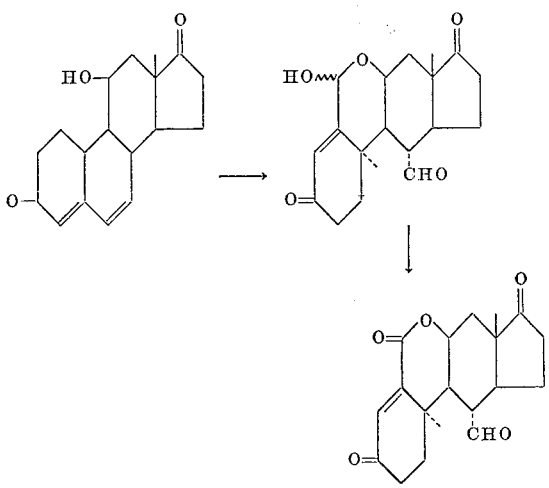

To a stirred mixture of 30.0 g. of 11β-hydroxyandrosta-4,6-diene-3,17-dione, 620 ml. of dioxane, 125 ml. of water, 25 ml. of pyridine and 2 g. of osmium tetroxide, under a nitrogen atmosphere, is added at intervals of 0, 1.5 and 3.0 hr. freshly prepared warm solutions of 14.25 g. of sodium periodate in 60 ml. of water. One hour after the last addition, a solution of 21.4 g. of sodium periodate in 90 ml. of water is added followed by 125 ml. of dioxane. The mixture is then stirred at room temperature for about 20 hours. A solution of 14.25 g. of sodium periodate in 60 ml. of water is added and the mixture is stirred for an additional period of about 24 hours. The reaction mixture is filtered and the precipitate is washed with about 250 ml. of 20% ethanol in dioxane. The filtrate and washings are combined and concentrated in vacuo until solids begin to precipitate. The residue is extracted twice with 500 ml. of 20% ethanol in chloroform, and then hydrogen sulfide is passed into the combined organic extracts for 2 minutes. The mixture is filtered through a pad of diatomaceous earth and then a 1 inch pad of magnesium silicate and the solids are washed with a solution of 20% ethanol in chloroform. The combined filtrate and washes are concentrated in vacuo and the residue is chromatographed on a column prepared by wet-packing 3 kg. of silica gel with 8% methanol in chloroform. Elution of the column with 2–4% methanol in chloroform gives two principal bands. Band I contains a small amount of unchanged starting material. Band II gives about 8.5 g. of 1,2,3,5,6a,7,7a,8,9,10,10a,11,11a,11b-tetradecahydro - 5 - hydroxy - 7aβ,11bα - dimethyl - 3,8-dioxobenz[d]indeno[5,6-b]pyran - 11α - carboxaldehyde which is stirred with 425 ml. of chloroform and 42 g. of manganese dioxide for about 24 hours at which time 100 ml. of absolute ethanol is added and the mixture is filtered. Concentration of the filtrate in vacuo gives a residue which is chromatographed on a column prepared by wet-packing 1 kg. of silica gel with 2 l. of 8% methanol in chloroform gives three principal bands of material. Material obtained from the first band is recrystallized from acetone to give 0.25 g. of 1,2,3,5,6a,7,7a,8,9,10,10a,11,11a,11b - tetradecahydro - 7aβ,11bα - dimethyl - 3,5,8 - trioxobenz[d]indeno[5,6 - b]pyran - 11α - carboxaldehyde, M.P. 235–237° C.; an analytical sample recrystallized from methylene chloride-acetone, melts at 240–243°;

$\lambda_{max.}^{EtOH}$ 243 m$\mu$ ($\epsilon$ 11,200); NMR, IR and mass spectra are in agreement with the structure.

14

*Analysis.*—Calcd. for $C_{19}H_{22}O_5$ (percent): C, 69.07; H, 6.71. Found (percent): C, 69.22; H, 6.63.

I claim:
1. A compound selected from the group consisting of a compound of the formula:

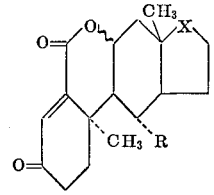

wherein R is —CHO, —COOR$_1$ or —CH$_2$OR$_2$, in which R$_1$ is hydrogen or methyl and R$_2$ is hydrogen or the acyl radical of a hydrocarbon carboxylic acid of 1 to 12 carbon atoms, inclusive, X is

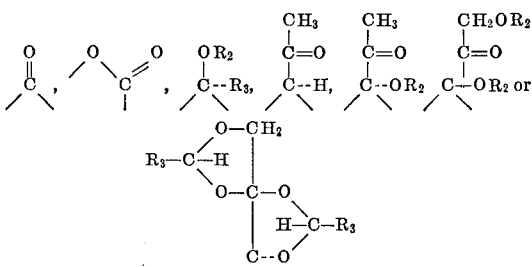

in which R$_2$ has the meaning given above, R$_3$ is hydrogen or a lower-alkyl radical of 1 to 6 carbon atoms, inclusive; and the alkali metal salts of those compounds wherein R is —COOR$_1$ in which R$_1$ is hydrogen.

2. 1,2,3,5,6a,7,7a,8,9,10,10a,11,11a, 11b-tetradecahydro-8β - hydroxy - 7aβ,11bα - dimethyl - 3,5 - dioxobenz[d] indeno-[5,6-b]pyran-11α carboxaldehyde, the compound of claim 1 wherein R is —CHO; and X is

in which R$_2$ and R$_3$ are each hydrogen.

3. 1,2,3,5,6a,7,7a,8,9,10,10a,11,11a,11b-tetradecahydro-8β- hydroxy - 7aβ,11bα - dimethyl - 3,5 - dioxobenz[d]indeno[5,6-b]pyran-11α-carboxaldehyde, acetate, the compound of claim 1, wherein R is —CHO; and X is

in which R$_2$ is acetyl and R$_3$ is hydrogen.

4. 1,2,3,5,6a,7,7a,8,9,10,10a,11,11a,11b-tetradecahydro-8β - hydroxy - 7a,β11bα - dimethyl - 3,5 - dioxobenz[d]indeno[5,6-b]pyran-11α-carboxylic acid, acetate, the compound of claim 1, wherein R is —COOR$_1$, in which R$_1$ is hydrogen; and X is

in which R$_2$ is acetyl and R$_3$ is hydrogen.

5. 1,2,3,5,6aβ,7,7a,8,9,10,10a,11,11a,11b - tetradecahydro - 7aβ,11bα - dimethyl - 3,5-dioxobenz[d]indeno[5,6-b] pyran-11α carboxylic acid, methyl ester, acetate, the compound of claim 1, wherein R is —COOR$_1$, in which R$_1$ is methyl; and X is

in which R$_2$ is acetyl and R$_3$ is hydrogen.

6. 1,2,6a,7,7a,8,9,10,10a,11,11a,11b - dodecahydro - 8β-hydroxy - 11α - (hydroxymethyl) - 7aβ-,11bα-dimethyl-benz[d]indeno[5,6-b]pyran-3,5-dione, 8-acetate, the compound of claim 1, wherein R is —CH$_2$OR$_2$, in which R$_2$ is hydrogen; and X is

in which R$_2$ is acetyl and R$_3$ is hydrogen.

7. 8β - acetyl - 11α - formyl - 1,2,6a,7,7a,8,9,10,10a,11,11a,11b - dodecahydro - 7aβ,11bα - dimethylbenz[d]indeno[5,6-b]pyran-3,5-dione, the compound of claim 1, wherein R is —CHO; and X is

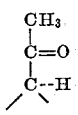

8. 8β - acetyl - 1,2,3,5,6aβ,7,7a,8,9,10,10a,11,11a,11b-tetradecahydro - 7aβ,11bα - dimethyl - 3,5 - dioxobenz[d]indeno[5,6-b]pyran-11α-carboxylic acid, the compound of claim 1, wherein R is —COOR$_1$ in which R$_1$ is hydrogen; and X is

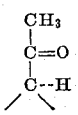

9. 8β - acetyl - 1,2,3,5,6aβ,7,7a,8,9,10,10a,11,11a,11b-tetradecahydro - 7aβ,11bα - dimethyl - 3,5 - dioxobenz[d]indeno[5,6-b]pyran-11α-carboxylic acid, methyl ester, the compound of claim 1, wherein R is —COOR$_1$, in which R$_1$ is methyl; and X is

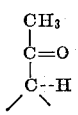

10. 1,2,3,5,6a,7,7a,8,9,10,10a,11,11a,11b - tetradecahydro - 7aβ,11bα - dimethyl - 3,5,8 - trioxobenz[d]indeno[5,6-b]pyran-11α-carboxaldehyde, the compound of claim 1, wherein R is —CHO; and X is

11. The process for the preparation of compound of the formula:

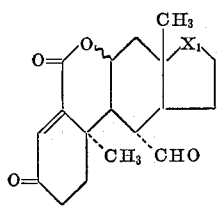

wherein X$_1$ is

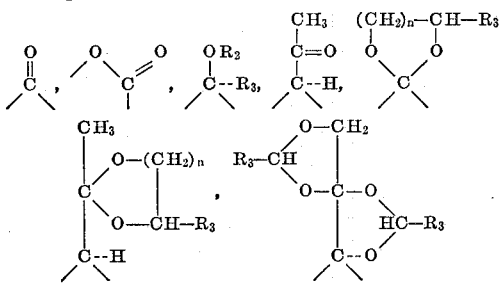

in which R$_2$ is hydrogen or the acyl radical of a hydrocarbon carboxylic acid of from 1 to 12 carbon atoms, inclusive, R$_3$ is hydrogen or a lower-alkyl radical of from 1 to 6 carbon atoms, inclusive, and n is the integer 1 or 2, which comprises subjecting a 3-keto-Δ$^{4,6}$-steroid of the formula:

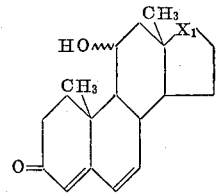

wherein X$_1$ has the meaning given above, to an osimum tetroxideperiodate oxygenation reaction to obtain the corresponding hemiacetal of the formula:

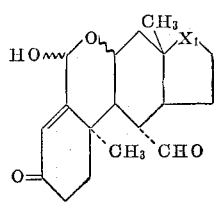

wherein X$_1$ has the meaning given above, and selectively oxidizing the 5-hydroxy function of the hemiacetal so obtained with an oxidizing agent selected from the group consisting of manganese dioxide and chromic acid.

12. The process of claim 11, wherein the periodate is sodium periodate and the oxidizing agent is manganese dioxide.

13. The process of claim 2, for the preparation of 1,2,3,5,6a,7,7a,8,9,10,10a,11,11a,11b - tetradecahydro - 8β-hydroxy - 7aβ,11bα-dimethyl - 3,5 - dioxobenz[d]indeno-[5,6-b]pyran-11α-carboxaldehyde, wherein the starting 3-keto-Δ$^{4,6}$-steroid is 11α,17β-dihydroxyandrosta-4,6-diene-3-one.

14. The process of claim 12 for the preparation of 8β-acetyl - 11α - formyl - 1,2,6a,7,7a,8,9,10,10a,11,11a,11b-dodecahydro - 7aβ,11bα - dimethylbenz[d]indeno[5,6-b]pyran-3,5-dione, wherein the starting 3-keto-Δ$^{4,6}$-steroid is 11α-hydroxy-4,6-pregnadiene-3,20-dione.

15. The process of claim 12 for the preparation of 1,2,3,5,6a,7,7a,8,9,10,10a,11,11a,11b - tetradecahydro-7aβ,11bα-dimethyl - 3,5,8 - trioxobenz[d]indeno[5,6-b]pyran - 11α-carboxaldehyde, wherein the starting 3-keto-Δ$^{4,6}$-steroid is 11β-hydroxyandrosta-4,6-diene-3,17-dione.

References Cited
UNITED STATES PATENTS 3,023,227  2/1962  Atwater _____ 260—343.2 XR
Re. 26,050  6/1966  Kerwin _____ 260—343.2

JOHN M. FORD, Primary Examiner

U.S. Cl. X.R.

260—340.9, 340.7, 345.3, 586 R, 593 R, 488 B; 424—279, 283

Case No. 2651

UNITED STATES PATENT OFFICE
CERTIFICATE OF CORRECTION

Patent No. 3,634,460      Dated 1-11-72

Inventor(s) Norman A. Nelson

It is certified that error appears in the above-identified patent and that said Letters Patent are hereby corrected as shown below:

Col. 13, line 64, for "chloroform gives" read --chloroform. Elution of the column with 2.5-4% methanol in chloroform gives--. Col. 16, line 38, for "Claim 2" read --Claim 12--.

Signed and sealed this 27th day of June 1972.

(SEAL)
Attest:

EDWARD M. FLETCHER, JR.        ROBERT GOTTSCHALK
Attesting Officer              Commissioner of Patents